Nov. 4, 1969     K. J. WHEELER     3,475,996

MACHINE TOOL PROGRAMMER

Filed May 2, 1967     5 Sheets-Sheet 1

INVENTOR
KENNETH JOHN WHEELER
BY
Shoemaker and Mattare
ATTORNEYS

INVENTOR
KENNETH JOHN WHEELER
BY
Shoemaker and Mattare
ATTORNEYS

# United States Patent Office 3,475,996
Patented Nov. 4, 1969

3,475,996
MACHINE TOOL PROGRAMMER
Kenneth J. Wheeler, Burgess Hill, England, assignor to Norcon (Norris) Limited, Burgess Hill, England, a British company
Filed May 2, 1967, Ser. No. 635,442
Int. Cl. B23b 39/20
U.S. Cl. 77—25                                    11 Claims

ABSTRACT OF THE DISCLOSURE

A control arrangement for an automatic machine tool employing a code plate having a pattern of perforations that are scanned by a digital fluid logic unit to actuate a digital actuator effecting relative movement between a tool and a workpiece.

---

The invention relates to automatic machine tool programme control arrangements.

One object of the present invention is to provide an automatic machine tool programme control arrangement which is of simple and reliable construction and yet provides high standards of precision, even where lengthy operations are concerned.

A cam and cam-follower system may be provided to initiate or control predetermined working operations, the cam being driven together with the perforated plate, and in this case the cam and the code plate are preferably mounted together to form a composite programme control unit.

The perforated plate may be moved along a linear guide by the drive means, or may be rotated on its axis.

The cam may directly operate mechanical sensing means to initiate a working operation, such as the drilling of a hole to a predetermined depth, or to an extent indicated by the cam profile, before or after the relative displacement has been effected. The cam profile may also be adapted to control additional means for effecting relative displacement of the tool with respect to the workpiece after said incremental step displacement has been effected.

Furthermore, where a given working step is to be performed at a given relative displacement, the driving means for the cam and code plate may be adapted to cause intermittent motion of the cam and code plate, detaining means being provided to hold them stationary after the given displacement has been effected for a predetermined time, or until the completion of a predetermined working operation is automatically indicated.

The use of such a composite control arrangement provides precise and consistent machine operations within the limits imposed by the available rise in cam-profile. Operations demanding a large rise require either an undesirably large cam, or an amplifier arrangement to magnify the cam-follower movement, and such measures inevitably lead to some loss of precision and reliability.

Two mutually perpendicular tool motions may be individually controlled by two cam and cam-follower systems, a separate cam-profile being provided for each motion on a composite control member which is also provided with a perforated code disc controlling a digital fluid logic unit adapted to operate a digital actuator to cause displacement of said tool by incremental steps in at least one of said motions.

Preferably, the arrangement is such that any one of a plurality of composite control members, each consisting of at least one cam and a code plate, can be interchanged readily to facilitate the production of different workpieces.

The cam and cam-follower systems can advantageous- ly take the form of hydraulically operated servo-systems. Also, the fluid logic unit can be adapted to operate valves controlling the flow of hydraulic fluid to the digital actuators.

Ancillary control inforation can be supplied by the provision of additional apertures on the code disc, positioned to operate ancillary logic units controlling functions such as spindle speed change, boring bar retraction, or the indexing of a turret or 3-position indexing chuck.

Preferably, the fluid logic units employ compressed air, which may be readily obtained from the conventional air-line commonly provided, suitable means being provided for filtering and reducing the pressure.

The invention will now be described with reference to the accompanying drawings, in which.

Figure 1:
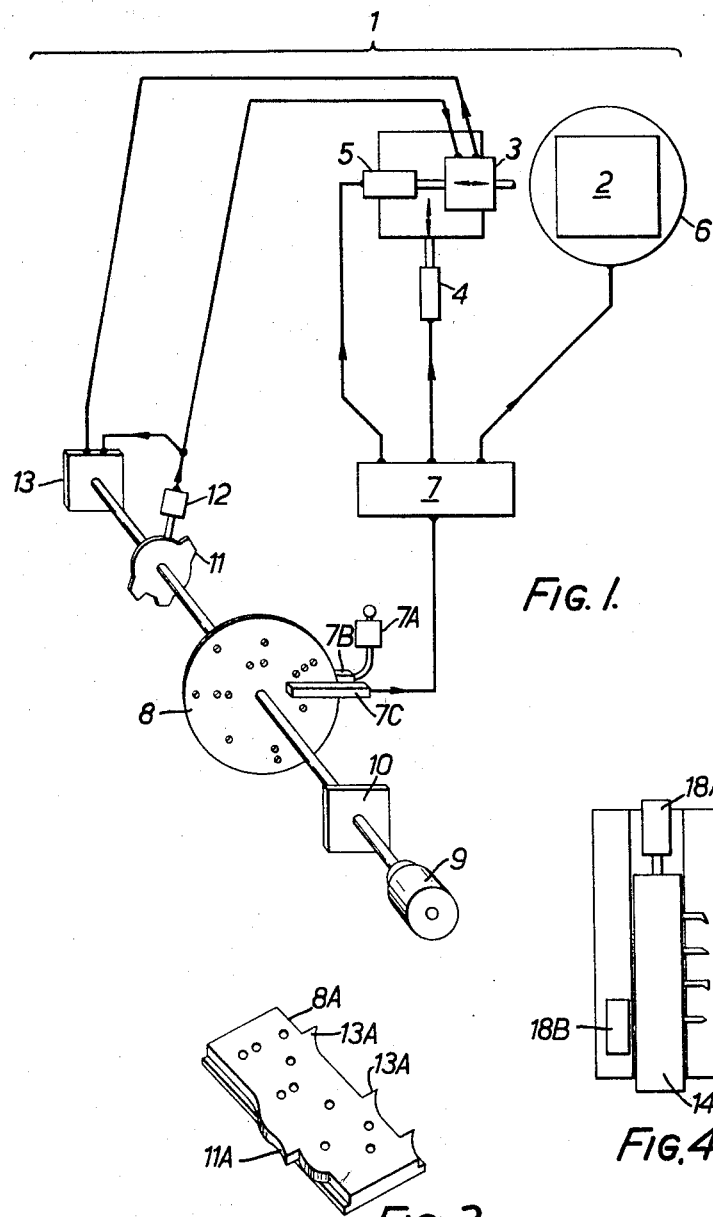
FIGURE 1 is a simplified block-schematic diagram illustrating an exemplary embodiment of the invention applied to a drilling machine.

FIGURE 1 illustrates an automatic machine tool 1, for the drilling of a plurality of holes at predetermined positions in a workpiece 2. The workpiece may be of any predetermined shape, and may have a complicated surface configuration, the representation in the drawing being purely schematic. In this embodiment, the machine has a drilling mechanism 3, the position of which can be altered with respect to the workpiece 2 by two digital actuators 4 and 5, acting in mutually perpendicular directions. A turret 6 is provided to rotate the workpiece 2 about an axis perpendicular to the plane containing the two directions in which movement is effected by the actuators 4 and 5.

Alternatively of course, the tool can be rotated with respect to the workpiece. The movements of the actuators 4 and 5 and the turret 6 are controlled by a fluid logic unit 7 that is in turn controlled by a code disc 8, on which perforations are provided to permit a fluid from a source 7A to pass through selected outlets in a plenum 7B to associated inlets in a reading head 7C mounted on the other side of the disc 8, and so feed input signals to the fluid logic unit 7 as the code disc is rotated by a drive 9 via a clutch 10. In this embodiment, a cam 11 is mounted to rotate with the code disc 8, and after the workpiece and drill have been set in a required positional relationship under the control of the fluid logic unit 7, the cam contour operates a cam-follower system 12 which then triggers the drilling mechanism 3, to drill a hole in the workpiece to a depth determined by the cam surface.

The fluid logic unit stores each input signal until it is modified by a further signal, so that it is not necessary to provide continual input signals from the disc 8 and cam 11, but instead of this the cam-follower system 12 can be used to cause the rotation of the cam 11 and disc 8 to be temporarily suspended. To this end, a detent 13, such as a ratchet or brake mechanism, is provided to lock the cam and disc until a release signal is received from the drilling mechanism 3 to indicate that the required drilling operation is completed. The cam and disc are then rotated to insert further input signals to the fluid logic unit, preparatory to a further operation in the programme cycle.

This last mentioned feature is of particular advantage when the required drilling operation is such that it will take a considerable length of time to complete. For example, in the case of a requirement to drill a plurality of holes in a large workpiece, where each drilling operation may last many minutes, it is still possible to insert perforations conveying the necessary information on a code disc of reasonable size and rotated at a reliable speed, and yet the necessary precision of positioning and timing can be obtained with a single rugged and reliable cam and disc unit.

The code plate, together with its associated cam, where applicable, constitutes a rugged, readily exchangeable programming controller, of a type eminently suited to machine tool operational requirements.

Figure 2:
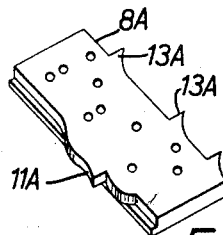
FIGURE 2 is a detail view of an alternative form of code plate.

The code plate 8 need not be a circular disc, and in some applications its perimeter can serve as a cam surface. Alternatively, a code plate of the type shown in FIGURE 2 can be used, in the form of a rectangular plate 8A in which the pattern of perforations required for a particular workpiece is provided, together with detents 13A and a cam-surface 11A, where necessary. The plate is adapted to slide along a linear guide under the control of the drive means 9.

Figure 3:
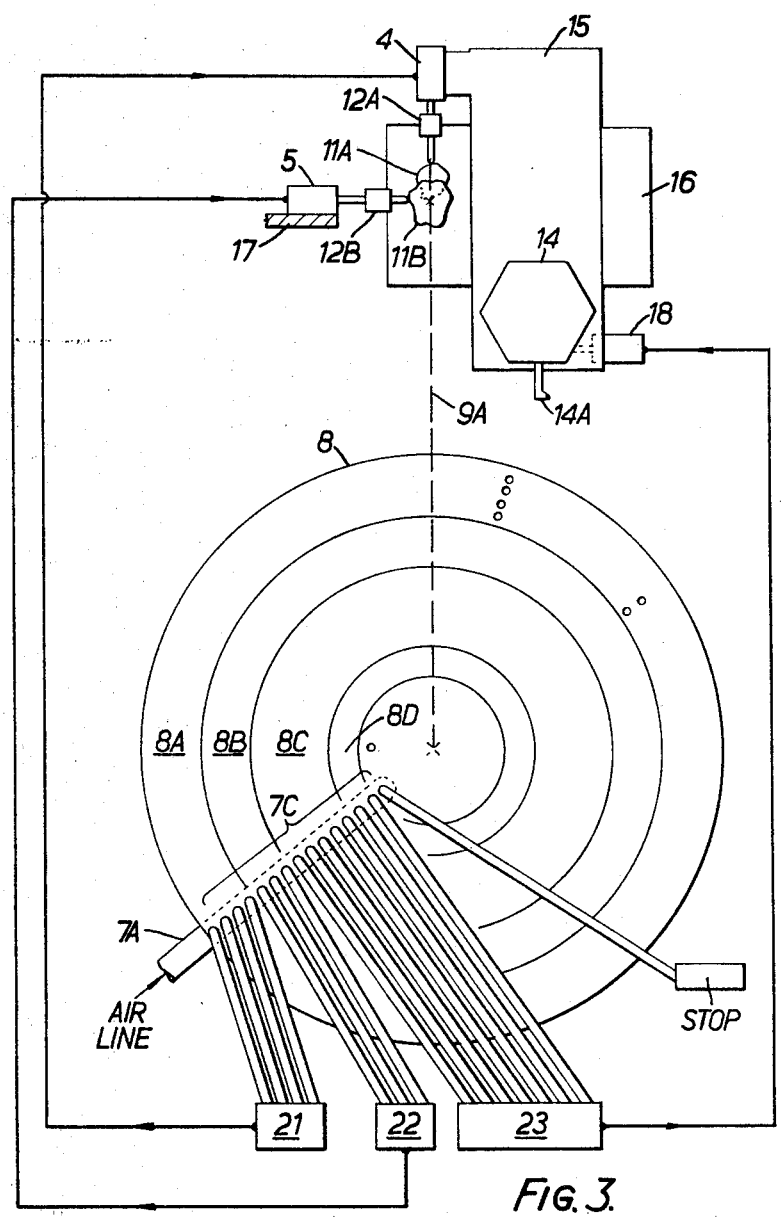
FIGURE 3 is a simplified block-schematic diagram of an exemplary embodiment of the invention applied to a capstan lathe.

FIGURE 3 illustrates the application of one embodiment of a control arrangement in accordance with the invention to a capstan lathe, employing a code plate in the form of a disc 8, similar to that shown in FIGURE 1, carrying two cams 11A and 11B on a common shaft 9A connected to a driving means (not shown) to control a turret 14 carrying tool 14A mounted on a traverse slide 15, which is itself mounted on a longitudinal slide 16. The composite control member formed by the disc 8 and cams 11A, 11B is mounted on the longitudinal slide 16 (the code disc being shown on a larger scale), and is rotated by its drive motor to programme two mutually perpendicular tool motions, in this case the movements of the traverse and longitudinal slides, and the setting and locking of turret drive 18. The cam 11A has an associated cam-follower 12A which is mounted upon the output shaft of a digital actuator 4 carried by the traverse slide 15, whilst the cam 11B has an associated cam-follower 12B mounted upon a digital actuator 5 which is carried on the bed 17 of the machine, the arrangement being such that the tool is moved under the control of the two cam profiles as the control disc 8 is rotated to complete an operational cycle.

The code disc 8 in this embodiment carries a number of apertures arranged in separate control bands, the two outer bands 8A and 8B being adapted to control the digital actuators 4 and 5, whilst the band 8C controls the drive 18 for indexing and the band 8D controls the turret drive for locking and clamping. A row of air-outlets is arranged in a plenum 7A on one side of the disc 8, each blowing air towards a corresponding number of fluid logic unit input ports in a reading head 7C positioned on the other side of the disc, so that when the rotation of the disc brings any aperture into line with the associated logic unit input port, an input signal is applied to the appropriate logic element to effect a control operation. In this embodiment, the input ports associated with the band 8A control a logic device 21 which in turn controls the digital actuator 4 to cause a stepped displacement of the longitudinal slide 15. In a similar manner, the input ports associated with the band 8B control a logic device 22 to effect a stepped displacement of the traverse slide 16 via the digital actuator 5. Fine control of the tool movement is then provided by cam-follower systems 12A and 12B.

In this way, the control arrangement provides accurate control of the tool movement over a range of movement far greater than that obtainable by unamplified movement of the cam-followers 12A or 12B.

The inner bands 8C and 8D on the code disc 8 control logic devices 23 to operate the turret index and locking means 18.

It will be apparent that additional bands may be provided for the control of logic devices governing ancillary functions.

Figure 4:
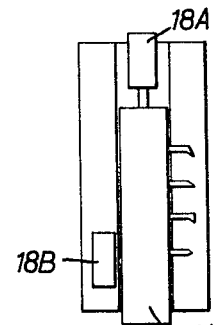
FIGURE 4 is a detail view of an alternate form of tool-carrier.

FIGURE 4 shows a detail of a modified tool-carrier, which is in the form of a slide 14A carrying a plurality of tools, which is stepped into position by a digital actuator 18A and clamped by a locking device 18B, the control being effected in a similar manner to that described with reference to FIGURE 3.

Figure 5:
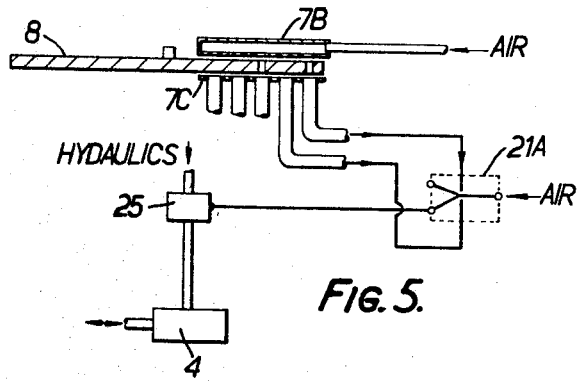
FIGURE 5 is a detail of one fluid logic unit suitable for the embodiments described.

Details of one fluid logic unit are shown schematically in FIGURE 5. An air supply to the plenum 7B passes through any aligned aperture in the code plate 8 to the associated input of a reading head 7C. The resultant signal is fed to a bistable fluid logic element 21A to control its output condition. In this embodiment, one output vents to atmosphere, and the other is connected to a monostable step-up relay 25 in a hydraulic system controlling a digital actuator 4. The fluid logic element acts as a memory to store the last-received instruction until it is countermanded, when a further aperture in the disc 8 comes into alignment with the appropriate input of the reading head.

Figure 6:
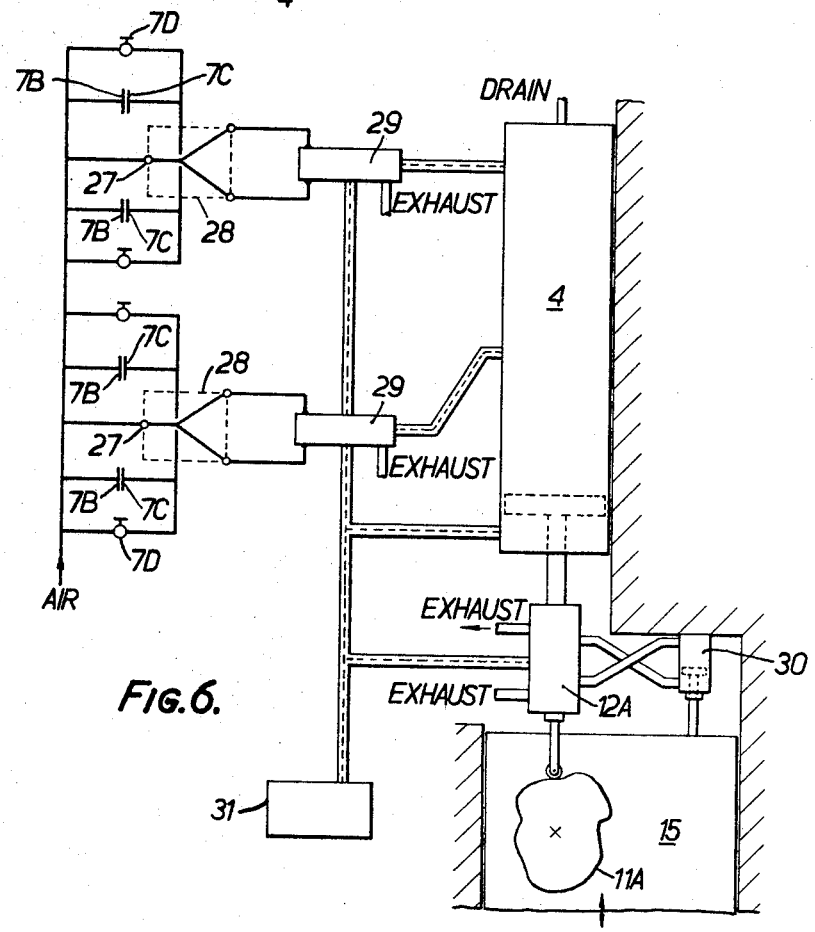
FIGURE 6 is a detail of the hydraulic system and fluid logic unit employed in the embodiment shown in FIGURE 4.

FIGURE 6 shows various features of a similar embodiment in greater detail, for the four input ports associated with the band 8A, these input ports controlling two bistable elements in the associated logic device. Filtered air at a pressure of 6 p.s.i. is fed to the supply input 27 of each bistable element 28, the state of which is controlled by the receipt of an input signal via an aperture in the code disc 8. Each bistable element controls the setting of an air-driven valve 29 to control a hydraulically operated digital actuator 4 which provides four positions, each providing a discrete displacement of the slide 15 carrying the tool.

The actuator arm carries the associated cam-follower 12A, which is in the form of a hydraulically operated relay in this embodiment, the cam-follower operating a cam-driven control valve in the hydraulic system to operate an associated tool-positioning jack 30. A pump 31 delivers oil at a pressure of 1000 p.s.i. to the valve 29 and the valve in cam-follower 12A.

Figure 7:
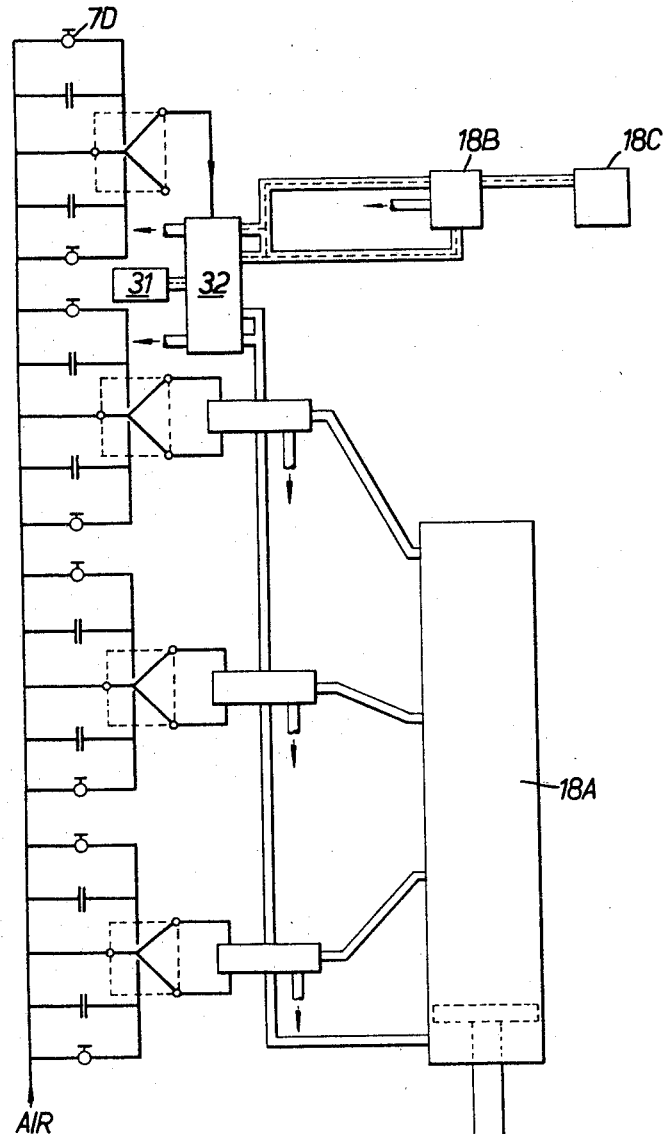
FIGURE 7 is a detail of the capstan control in the embodiment shown in FIGURE 4.

The turret control is effected by a digital indexing jack 18A driven via hydraulic control valves operated by three bistable logic elements to give 6 positions, as shown in FIGURE 7. The turret locking and clamping is effected by a further bistable logic element controlling a hydraulic lock 18B and a claimping piston 18C, via a monostable valve 32.

Each inlet port in the logic unit is provided with a manually operated auxiliary input valve 7D, so that any desired control signal may be applied by an operator.

Figure 8:
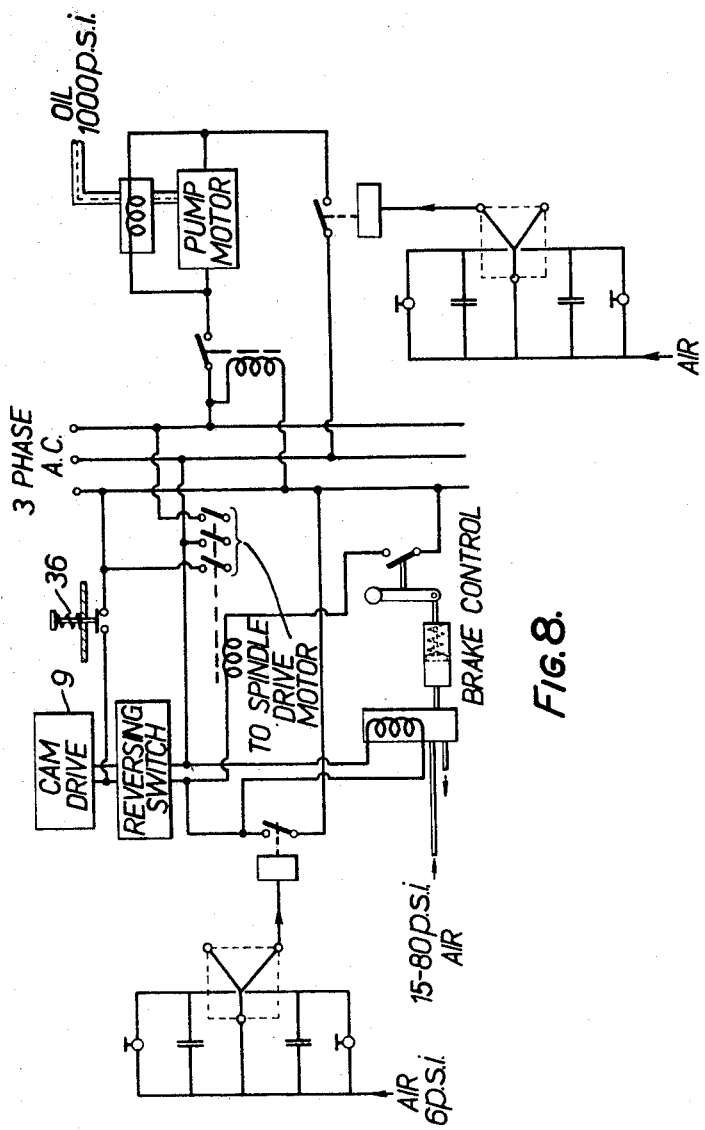
FIGURE 8 is an electrical circuit diagram of the embodiment shown in FIGURE 4.

The electrical circuit of the machine is shown in FIGURE 8. The power supply to the spindle drive motor and cam drive motor 9 includes fail-safe inter-locks, and an additional bistable logic element 34 is employed to control a pressure switch 35 so that the machine cannot be started if there is no air-pressure available for the fluid logic unit, and an aperture on the code disc 8 is provided to automatically switch off the drive motors at the completion of an operational cycle.

By forming the composite control member as an integral unit providing all the necessary control information for a given proofing operation, the invention provides a simple and reliable means of resetting the machine for different operations, as it is only necessary to remove one control member and insert another. A cut-out switch 36 may be provided in the cam-drive motor circuit to prevent operation when no control member is in place, and means may be provided for reversing the rotation of the cam drive.

The operations required for machine setting are as follows:

(i) Turn off air supply to logic cam inputs.
(ii) Fit necessary composite control member.
(iii) Place tools in turret (tools pre-set on jig).
(iv) Switch on hydraulic and pneumatic supplies.
(v) Manually retract turret.
(vi) Manually index turret to start position.
(vii) Check each tooling position against master component by manually setting-in each operation starting position.
(viii) Manually retract turret.
(ix) Manually index turret to "start" position.
(x) Set cam to start position.
(xi) Turn on cam air supply.

The machine is now ready for use. If the hydraulic and pneumatic supplies are turned off before the machine is used, the system will set itself to the start position automatically when switched on again.

After the component has been loaded, the spindle motor must be started, followed by the cam-driving motor. The machine cycle then starts. Interruptions should only be made when the turret slide is in the retracted position. To make an interruption, the cam-driving motor must be switched off at the required time.

To return to some previous point in the cycle, the air supply to the cams is turned off and the cam motor put into reverse until the position has been reached.

To re-start the machine cycle, the air supply to the cams is switched on, and the cam motor set into forward motion.

The bistable logic elements have no moving parts, and may be formed by photo-etching a plastic sheet bonded to a metal plate, the resultant unit being small and rugged, reliable in operation, and requiring negligible maintenance. Furthermore, the use of the conventional air supply line avoids the need for any additional stabilised power supplies.

What I claim as my invention and desire to secure by Letters Patent of the United States is:

1. An automatic machine tool programme control arrangement comprising: a scanning device; a code plate carrying control signals in the form of a pattern of perforations; said code plate being moved through said scanning device to provide input signals for a digital fluid logic unit controlling a digital actuator to cause predetermined relative displacement between a tool and a workpiece by incremental steps in a given direction, and to initiate or control subsequent working operations; drive means connected to said code plate for moving said code plate so that it is scanned to complete a predetermined programme; said code plate carrying at least one cam surface; and a cam-follower associated with said scanning device; said cam and cam-follower controlling further predetermined relative displacements between the tool and workpiece for a given incremental movement of said code plate.

2. A control arrangement as claimed in claim 1, in which said cam and cam-follower control a continuous relative displacement between said tool and said workpiece in said given direction.

3. A control arrangement as claimed in claim 1, in which said code plate carries a pattern of perforations providing control signals operating two separate digital actuators acting in mutually perpendicular directions.

4. A control arrangement as claimed in claim 1, in which said code plate carries a pattern of perforations providing control signals operating two separate digital actuators acting in mutually perpendicular directions.

4. A control arrangement as claimed in claim 1, in which said code plate carries a pattern of perforations providing control signals actuating a tool-carrier holding a plurality of tools to bring a given tool into the working position.

5. A control arrangement as claimed in claim 4, in which said tool-carrier is a turret.

6. A control arrangement as claimed in claim 4, in which said tool-carrier is a linear slide.

7. A control arrangement as claimed in claim 1, in which said cam and cam-follower control a hydraulically operated servo-system.

8. A control arrangement as claimed in claim 1, in which said fluid logic unit employs compressed air.

9. A control arrangement as claimed in claim 1, in which said code plate is driven along a linear guide by said drive means.

10. A control arrangement as claimed in claim 1, in which said code plate is rotated about a transverse axis by said drive means.

11. A control arrangement as claimed in claim 1, in which said drive means effect intermittent motion of said code plate, said code plate being provided with detaining means to hold said plate stationary after a given displacement has been effected by said drive means until a predetermined working operation is completed.

References Cited

UNITED STATES PATENTS

| | | | |
|---|---|---|---|
| 3,012,545 | 12/1961 | Goldmann | 91—37 XR |
| 3,174,406 | 3/1965 | Hague et al. | 91—37 XR |
| 3,198,084 | 8/1965 | Hague et al. | 91—37 |
| 3,282,049 | 11/1966 | Benton | 91—37 XR |

FRANCIS S. HUSAR, Primary Examiner

U.S. Cl. X.R.
77—32.1; 90—13; 91—37